United States Patent
Deiss et al.

(10) Patent No.: US 10,071,526 B2
(45) Date of Patent: Sep. 11, 2018

(54) ADAPTATION METHOD AND PRODUCTION METHOD FOR COMPONENTS PRODUCED BY SLM

(71) Applicant: SIEMENS AKTIENGESELLSCHAFT, München (DE)

(72) Inventors: Olga Deiss, Düsseldorf (DE); Bernd Reinarz, Meerbusch (DE); Jaap Van Kampen, Ar Roermond (NL)

(73) Assignee: SIEMENS AKTIENGESELLSCHAFT (DE)

( * ) Notice: Subject to any disclaimer, the term of this patent is extended or adjusted under 35 U.S.C. 154(b) by 286 days.

(21) Appl. No.: 14/902,639

(22) PCT Filed: Jun. 16, 2014

(86) PCT No.: PCT/EP2014/062515
§ 371 (c)(1),
(2) Date: Jan. 4, 2016

(87) PCT Pub. No.: WO2015/003876
PCT Pub. Date: Jan. 15, 2015

(65) Prior Publication Data
US 2016/0167302 A1    Jun. 16, 2016

(30) Foreign Application Priority Data
Jul. 9, 2013   (EP) .................................. 13175680

(51) Int. Cl.
*G06F 19/00*     (2018.01)
*B29C 67/00*     (2017.01)
*G05B 19/4099*   (2006.01)
*B29C 64/153*    (2017.01)
*B29C 64/386*    (2017.01)
*B33Y 10/00*     (2015.01)
*B33Y 50/02*     (2015.01)

(52) U.S. Cl.
CPC ........ *B29C 67/0077* (2013.01); *B29C 64/153* (2017.08); *B29C 64/386* (2017.08);
(Continued)

(58) Field of Classification Search
CPC ....... B33Y 80/00; B33Y 10/00; B22F 3/1055; B22F 5/009; B22F 5/04; G06F 17/50;
(Continued)

(56) References Cited

U.S. PATENT DOCUMENTS 4,199,934 A * 4/1980 Meyer ...................... F23R 3/02
60/39.23
4,519,563 A * 5/1985 Tamura ................. B64C 21/025
244/208
(Continued)

FOREIGN PATENT DOCUMENTS

CN       1921970 A      2/2007
CN       101855061 A    10/2010
(Continued)

OTHER PUBLICATIONS

International Search Report for PCT/EP2014/062515, dated Sep. 22, 2014.
(Continued)

*Primary Examiner* — Darrin D Dunn
(74) *Attorney, Agent, or Firm* — Schmeiser Olsen & Watts LLP

(57) ABSTRACT

An adaptation method for a modelling method in which, by means of target geometry, model geometry, which is derived from the target geometry, is created for an object to be produced by a selective laser melting method is provided. In the adaptation method, adapted model geometry is produced from the derived model geometry by dimension adaptation by means of a correction factor and/or by geometry adaptation by means of correction geometry.

5 Claims, 1 Drawing Sheet

(52) U.S. Cl.
CPC .......... *G05B 19/4099* (2013.01); *B33Y 10/00* (2014.12); *B33Y 50/02* (2014.12); *G05B 2219/35134* (2013.01); *G05B 2219/49007* (2013.01)

(58) Field of Classification Search
CPC ............... G06F 17/30; G06F 17/30259; G06F 2217/12; G06F 2217/34; G05B 2219/49007; G05B 2219/49019
See application file for complete search history.

(56) References Cited

U.S. PATENT DOCUMENTS

| | | | | |
|---|---|---|---|---|
| 4,648,745 | A * | 3/1987 | Hulsbergen | E02D 15/08 405/158 |
| 5,568,724 | A * | 10/1996 | Lindner | F02K 1/28 415/914 |
| 5,738,817 | A * | 4/1998 | Danforth | B29C 41/36 264/255 |
| 7,050,876 | B1 * | 5/2006 | Fu | G05B 19/4099 345/420 |
| 8,175,734 | B2 * | 5/2012 | Fogel | G06F 17/50 700/119 |
| 9,022,770 | B2 * | 5/2015 | Pettis | G06F 3/12 425/174.4 |
| 9,308,690 | B2 * | 4/2016 | Boyer | B29C 67/0051 |
| 9,574,533 | B2 * | 2/2017 | Monaghan | F02M 55/008 |
| 2002/0171177 | A1 * | 11/2002 | Kritchman | B29C 67/0059 264/401 |
| 2005/0033478 | A1 * | 2/2005 | Hunter | B28B 1/001 700/273 |
| 2005/0159936 | A1 * | 7/2005 | Rees | G06F 17/50 703/6 |
| 2005/0232770 | A1 * | 10/2005 | Rawlinson | F01D 5/187 416/97 R |
| 2007/0156377 | A1 * | 7/2007 | Gurpinar | E21B 43/00 703/10 |
| 2008/0065259 | A1 * | 3/2008 | Dietrich | G05B 19/4099 700/182 |
| 2009/0072447 | A1 * | 3/2009 | Hull | B33Y 40/00 264/401 |
| 2009/0169664 | A1 * | 7/2009 | Cox | B01F 3/188 425/174.4 |
| 2009/0255264 | A1 * | 10/2009 | McMasters | F02K 9/52 60/747 |
| 2009/0256007 | A1 * | 10/2009 | McMasters | B23P 6/007 239/463 |
| 2010/0003619 | A1 * | 1/2010 | Das | G03B 27/42 430/290 |
| 2010/0025001 | A1 * | 2/2010 | Lee | B22C 7/02 164/23 |
| 2010/0065142 | A1 * | 3/2010 | McMasters | B23P 6/007 138/115 |
| 2010/0125356 | A1 | 5/2010 | Shkolnik et al. | |
| 2010/0224348 | A1 * | 9/2010 | Todorovic | B64D 33/10 165/177 |
| 2010/0300713 | A1 * | 12/2010 | Kume | B23B 29/03482 173/4 |
| 2011/0062700 | A1 * | 3/2011 | Corbett, Jr. | F16L 37/0925 285/31 |
| 2011/0099810 | A1 * | 5/2011 | Stankowski | B22F 7/062 29/888 |
| 2011/0104626 | A1 * | 5/2011 | Bottcher et al. | F23D 11/36 431/354 |
| 2011/0127213 | A1 * | 6/2011 | Gennaro | B01D 39/20 210/506 |
| 2012/0193841 | A1 * | 8/2012 | Wang | B22F 3/1055 264/645 |
| 2012/0198676 | A1 * | 8/2012 | Rickenbacher | B23P 6/005 29/402.13 |
| 2012/0228397 | A1 * | 9/2012 | Thomson | F23R 3/28 239/13 |
| 2012/0266439 | A1 * | 10/2012 | Geiger | B22F 3/1055 29/428 |
| 2012/0297979 | A1 * | 11/2012 | Klingenburg | F24F 3/14 95/213 |
| 2012/0326356 | A1 * | 12/2012 | Martin | B29C 67/0051 264/401 |
| 2013/0030773 | A1 * | 1/2013 | O'Hare | G06F 17/50 703/1 |
| 2013/0071562 | A1 * | 3/2013 | Szuromi | B22F 3/1055 427/237 |
| 2013/0124151 | A1 * | 5/2013 | Mech | G06F 17/50 703/1 |
| 2013/0176312 | A1 * | 7/2013 | Schouwenburg | B29C 67/0088 345/424 |
| 2013/0176814 | A1 * | 7/2013 | Gillis | B01F 5/0473 366/178.1 |
| 2013/0231609 | A1 * | 9/2013 | Slocum | A61B 17/00491 604/82 |
| 2013/0264750 | A1 * | 10/2013 | Hofacker | B22F 3/1055 264/497 |
| 2013/0280091 | A1 * | 10/2013 | Propheter-Hinckley | B22C 9/10 416/97 A |
| 2013/0280092 | A1 * | 10/2013 | Xu | F01D 5/187 416/97 R |
| 2013/0311450 | A1 * | 11/2013 | Ramani | G06F 17/30259 707/722 |
| 2013/0318975 | A1 * | 12/2013 | Stoia | F23R 3/283 60/737 |
| 2014/0044982 | A1 * | 2/2014 | Suh | B22F 3/008 428/544 |
| 2014/0084583 | A1 * | 3/2014 | Hemingway | B29C 67/0059 285/374 |
| 2014/0169974 | A1 * | 6/2014 | Chouhan | F01D 5/225 416/212 A |
| 2014/0169981 | A1 * | 6/2014 | Bales | B22F 5/04 416/96 R |
| 2014/0202163 | A1 * | 7/2014 | Johnson | F02C 7/00 60/752 |
| 2014/0228860 | A1 * | 8/2014 | Steines | A61F 2/30942 606/130 |
| 2014/0338771 | A1 * | 11/2014 | Brown | F15D 1/025 138/40 |
| 2014/0367495 | A1 * | 12/2014 | Monaghan | F02M 55/008 239/408 |
| 2015/0099087 | A1 * | 4/2015 | Reznar | B29C 70/68 428/68 |
| 2015/0121883 | A1 * | 5/2015 | Wolfe | F01D 25/00 60/739 |
| 2016/0010466 | A1 * | 1/2016 | Lamson | F01D 5/187 60/772 |
| 2016/0052057 | A1 * | 2/2016 | Xu | F01D 5/187 419/5 |
| 2016/0167302 | A1 * | 6/2016 | Deiss | B29C 67/0077 700/98 |
| 2017/0282455 | A1 * | 10/2017 | DeFelice | B33Y 10/00 |

FOREIGN PATENT DOCUMENTS

| | | |
|---|---|---|
| DE | 102011113445 A1 | 3/2013 |
| EP | 2186625 A2 | 5/2010 |
| WO | 2005080029 A1 | 9/2005 |
| WO | WO 2013037346 A1 | 3/2013 |

OTHER PUBLICATIONS

Translation of Chinese Office Action for Application No. 201480039586.0, dated Aug. 4, 2016.

* cited by examiner

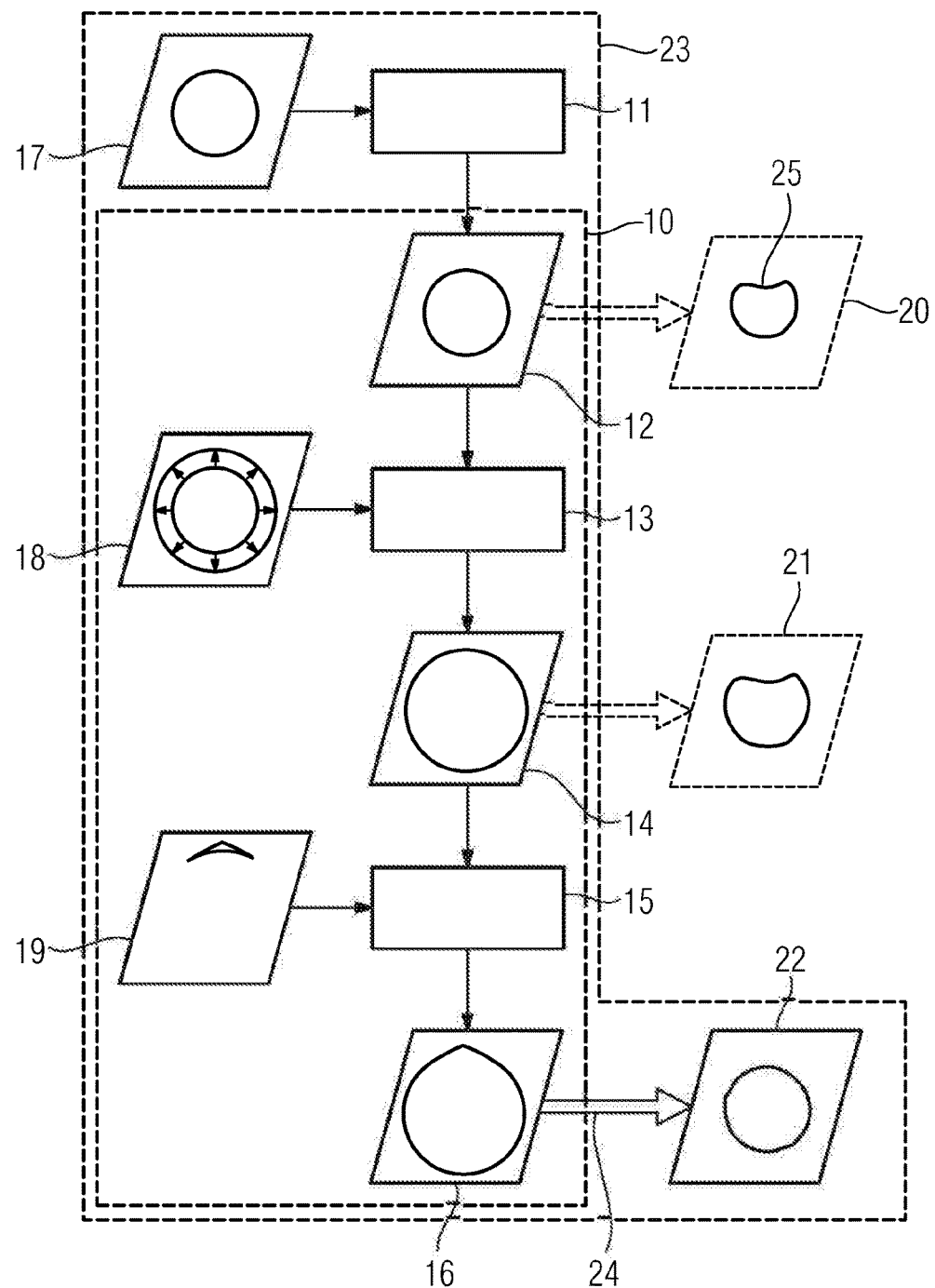

ADAPTATION METHOD AND PRODUCTION METHOD FOR COMPONENTS PRODUCED BY SLM

CROSS-REFERENCE TO RELATED APPLICATIONS

This application claims priority to PCT Application No. PCT/EP2014/062515, having a filing date of Jun. 16, 2014, based off of European Application No. 13175680.1 having a filing date of Jul. 9, 2013, the entire contents of which are hereby incorporated by reference.

FIELD OF TECHNOLOGY

The following relates to an adaptation method for a modeling method, in which, with the aid of a target geometry, a model geometry derived from the target geometry is compiled for an object to be produced by a selective laser melting method, and to a production method in which the adaptation method is integrated.

BACKGROUND

Selective laser melting methods (abbreviated to SLM) are known. In a selective laser melting method, powdered material is used, from which an object is produced stepwise by means of a laser.

In the selective laser melting method, overhangs, step effects and powder adhesions may occur, which, particularly for components with a very stringent requirement for the measurement accuracy, in particular gas turbine components with flow channels, require finishing and therefore additional outlay.

SUMMARY

An aspect relates to removing disadvantages and, to this end, to provide an adaptation method and a production method.

In the adaptation method according to embodiments of the invention for a modeling method, in which, with the aid of a target geometry, a model geometry derived from the target geometry is compiled for an object to be produced by a selective laser melting method, an adapted model geometry is produced from the derived model geometry by dimensional adaptation by means of a correction factor and/or a geometrical adaptation by means of a correction geometry.

With the adaptation method according to embodiments of the invention, it is advantageously possible to compensate for overhangs, agglomerations and step effects of the selective laser melting method. Finishing can be obviated. In particular, flow channels can be produced in gas turbine components at positions which are not accessible for finishing but, by virtue of the adaptation method according to embodiments of the invention, nevertheless fulfill all the requirements. Additional design possibilities are therefore made possible.

In one advantageous embodiment of the adaptation method according to embodiments of the invention, the dimensional adaptation and/or the geometrical adaptation is carried out as a function of the orientation of the target geometry in space.

Taking into account the orientation of the target geometry improves the result of the adaptation method according to embodiments of the invention. For example, overhangs occur to an increased extent in the direction of the force of gravity in a cavity (channel) extending perpendicularly to the construction direction. This and other orientation-dependent phenomena can therefore be counteracted better. As a function of the orientation of the target geometry, it is therefore possible to specify various correction factors and/or correction geometries. The range of applications of the adaptation method according to embodiments of the invention is increased and its performance is enhanced.

In another advantageous embodiment of the adaptation method according to embodiments of the invention, the dimensional adaptation and/or the geometrical adaptation is carried out as a function of the dimension of the target geometry.

Thus, in the case of smaller dimensions, the adaptations are relatively large compared with adaptations in the case of larger dimensions. As a function of the dimension of the target geometry, it is therefore possible to specify correction factors of different size and/or different correction geometries. With this measure as well, the range of applications of the adaptation method according to embodiments of the invention is increased and its performance is enhanced.

In another advantageous embodiment of the adaptation method according to embodiments of the invention, the dimensional adaptation and/or the geometrical adaptation is carried out as a function of the configuration of the target geometry.

Thus, the adaptations in the case of large shape changes are relatively large compared with adaptations in the case of small shape changes. As a function of the variety of shapes of the target geometry, it is therefore possible to specify correction factors of different size and/or different correction geometries.

In another advantageous embodiment of the adaptation method according to the invention, a bore with a drop-shaped cross section is produced as an adapted model geometry from a bore with a circular cross section as the target geometry.

Particularly in the case of bores, stringent requirements are placed on the measurement accuracy, since with a deviation of the diameter from the setpoint diameter, flow rates of a medium flowing through the bore can deviate significantly from the specification. The adaptation method according to embodiments of the invention also solves this particular requirement.

In all alternative embodiments, the adaptation method according to the invention is preferably integrated into a production method. In the production method according to embodiments of the invention, during a modeling method, with the aid of a target geometry, a model geometry derived from the target geometry is produced. An adapted model geometry is subsequently produced in the adaptation method according to embodiments of the invention from the derived model geometry.

An adapted object is produced from the adapted model geometry in a selective laser melting method.

A production method is therefore provided, with which shaped parts can advantageously be produced with geometrical accuracy, without additional finishing being necessary. The production method according to embodiments of the invention is therefore more economical than conventional methods. Furthermore, it is possible to produce shaped parts with undercuts or even internally lying flow channels with narrow manufacturing tolerances, which is relevant particularly for the construction of gas turbine components. Thus, in an advantageous embodiment of the production method according to the invention, a gas turbine component having a flow channel is produced as the object. The flow channel may, in particular, be a fuel channel or a cooling air channel

BRIEF DESCRIPTION

Some of the embodiments will be described in detail, with reference to the following FIGURES, wherein like designations denote like members, wherein:

The FIGURE shows a diagram of an adaptation method 10 in an exemplary embodiment. The adaptation method 10 is in this case integrated into a production method 23.

DETAILED DESCRIPTION

In the production method 23 according to embodiments of the invention, a shaped part, referred to here as an adapted object 22, is produced by a selective laser melting method 24. The selective laser melting method 24 in this case corresponds to known methods. The selective laser melting method 24 is computer-controlled and requires a model geometry 12, 14, 16 in the form of a dataset for the production of an object.

In the production method 23 according to embodiments of the invention, a derived model geometry 12 is produced from a target geometry 17 in a modeling method 11. The modeling method 11 corresponds in this case to known methods. In the FIGURE, a bore with a circular cross section is shown by way of example as the target geometry 17.

In the production method according to embodiments of the invention, the derived model geometry 12 is adapted before the selective laser melting method 24. This adaptation is carried out in the adaptation method 10 according to embodiments of the invention. The adaptation method 10 is carried out, in particular, at the time of the design configuration by means of CAD (Computer Aided Design).

In the adaptation method according to embodiments of the invention, an adapted model geometry 16 is produced from the derived model geometry 12 by dimensional adaptation 13 or geometrical adaptation 15 or dimensional adaptation 13 and geometrical adaptation 15 being carried out. In the variant shown, by way of example, first dimensional adaptation 13 and then geometrical adaptation 15 are carried out. According to embodiments of the invention, the adaptations 13, 15 may also be carried out in the reverse order. According to embodiments of the invention, at least one of the adaptations 13, 15 is carried out.

According to embodiments of the invention, the model geometry which is used in the selective laser melting method 24 is referred to as an adapted model geometry 16. According to embodiments of the invention, a partially adapted model geometry 14 refers to the model geometry which subsequently experiences further adaptation 13, 15. In the FIGURE, a partially adapted model geometry 14 as a result of the dimensional adaptation 13 is represented for illustration.

In the FIGURE, the resulting objects 20, 21, which have been produced from the respective model geometries 12, 14 by the selective laser melting method 24 are furthermore shown in dashed symbols for illustration. Without the adaptation method 10, a shaped part referred to here as an original object 20 would be produced from the derived model geometry 12 in the selective laser melting method 24.

The original object 20 in the FIGURE is likewise a bore, corresponding to the target geometry 17. The original object 20 has as a bore a smaller diameter than the target geometry 17 and a shape differing from the target geometry 17. The original object 20 has an overhang on its upper contour edge.

During the dimensional adaptation 13, the derived model geometry 12, or the partially adapted model geometry 14, is adapted according to embodiments of the invention by a correction factor 18. During the selective laser melting method 24, adhesions may occur which reduce the diameter of cavities. By increasing the dimension by the correction factor 18, this reduction of the cavity can be compensated for. The correction factor 18 is in this case specified. The correction factor 18 represents a percentage increase of polygonal shapes by which the target geometry 17 is described in the model.

In the embodiment shown, the derived model geometry 12 has its dimension modified by the dimensional adaptation 13. Relationships in the geometry remain unaffected. The shape remains essentially the same. Particularly when the derived model geometry 12 is a bore, the derived model geometry 12 is enlarged.

The partially adapted model geometry 14 is shown in the FIGURE as a result of a dimensional adaptation 13. The partially adapted model geometry 14 has as a bore a larger diameter than in the derived model geometry 12. When these data of the partially adapted geometry 14 are used in the selective laser melting method 24, a shaped part referred to here as a partially adapted object 21 is then produced. The partially adapted object 21 is in this case a bore which now has the same diameter as the target geometry 17.

During the geometrical adaptation 15, the derived model geometry 12, or the partially adapted model geometry 14, is adapted according to embodiments of the invention by a correction geometry 19. During the selective laser melting method 24, undesired overhangs 25 may occur, so that the configuration of the shaped part produced deviates from the configuration of the target geometry 17. By modification of the shape of the model geometry by supplementation with the correction geometry 19, such an overhang can be compensated for. The correction geometry 19 is in this case specified.

In the embodiment shown, the partially adapted model geometry 14 has its shape modified by the geometrical adaptation 15. Relationships in the geometry are changed. The dimension of the geometry remains essentially unchanged. In particular when the partially adapted model geometry 14 is a bore with a circular cross section, the derived model geometry 12 is modified in such a way that the adapted model geometry 16 is a bore with a drop-shaped cross section. In this example, the correction geometry 19 is essentially a triangle by which the circular bore is supplemented in the upper region. According to embodiments of the invention, other correction geometries 19 may also be envisioned, for example step-shaped quadrilaterals. With the geometrical adaptation 15, occurrence of a critical transition region—so that overhangs are formed—is counteracted. The correction geometry 19 has, in particular, a configuration which corresponds essentially to a configuration, reflected at the contour edge, of the overhang 25 of the original object 20.

In the FIGURE, the adapted model geometry 16 is shown as a result of the geometrical adaptation 15. In the adapted model geometry 16, the bore now has a drop-shaped cross section. When the data of the adapted geometry 16 are used in the selective laser melting method 24, the adapted object 22 is formed. The adapted object 22 is in this case a bore which has essentially the same shape as the target geometry 17.

The correction factor 18 and the correction geometry 19 are variable and may, for example, be taken from a stored table. In this way, various parameters may be taken into account, for example material type, layer thickness, diameter or construction direction.

The selective laser melting method 24 constitutes a layer construction method. In this, a so-called staircase effect may occur. This effect is dependent on the orientation of the shaped part and its dimension. The geometrical adaptation 15 compensates also for staircase effects.

The correction geometry 19 is both orientation-dependent and dimension-dependent. Particularly in the case of a bore as the target geometry 17, the correction geometry 19 is described by a function which is dependent on the polar angle, the azimuth angle and the diameter of the bore.

Although the invention has been illustrated and described in detail with the aid of the preferred exemplary embodiment, the invention is not restricted to the examples disclosed and other variants may be derived therefrom by the person skilled in the art without departing from the protective scope of the invention.

The invention claimed is:

1. A method for producing an adapted object using a computer-controlled selective laser melting method, the method comprising:
    applying a modeling method to derive a model geometry from a target geometry of an object;
    creating an adapted model geometry from the model geometry by applying: (i) a correction factor to correct a dimension of the model geometry to compensate for a change in a cavity of the object that could occur during selective laser melting so that a dimension of the adapted model geometry corresponds to a dimension of the target geometry of the object, and (ii) a correction geometry to correct a shape of the model geometry to compensate for an overhang in the cavity of the object that could occur during selective laser melting so that a shape of the adapted model geometry corresponds to a shape of the target geometry of the object, wherein, as a result of the application of the correction factor and/or the correction geometry, the adapted model geometry is a bore with a drop-shaped cross section; and
    producing the adapted object using the computer-controlled selective laser melting method using the adapted model geometry, the adapted object being a bore with a circular cross section that corresponds to the target geometry.

2. The method as claimed in claim 1, wherein the correction factor and the correction geometry is carried out as a function of the orientation of the target geometry in space.

3. The method as claimed claim in 8, wherein the correction factor and the correction geometry is carried out as a function of the dimension of the target geometry.

4. The method as claimed in claim 1, wherein the correction factor and the correction geometry is carried out as a function of the configuration of the target geometry.

5. The method as claimed in claim 1, wherein a gas turbine component having a flow channel is produced as the adapted object.

* * * * *